United States Patent
Suzuki et al.

(10) Patent No.: US 12,012,170 B2
(45) Date of Patent: Jun. 18, 2024

(54) SCREEN IMAGE PROJECTION SYSTEM FOR MOVING OBJECT, SCREEN IMAGE PROJECTION DEVICE, OPTICAL ELEMENT FOR SCREEN IMAGE DISPLAY LIGHT DIFFRACTION, HELMET, AND METHOD FOR PROJECTING SCREEN IMAGE

(71) Applicant: Sony Semiconductor Solutions Corporation, Kanagawa (JP)

(72) Inventors: Takaharu Suzuki, Kanagawa (JP); Hiroshi Ikuta, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 629 days.

(21) Appl. No.: 17/253,745

(22) PCT Filed: May 16, 2019

(86) PCT No.: PCT/JP2019/019422
§ 371 (c)(1),
(2) Date: Dec. 18, 2020

(87) PCT Pub. No.: WO2020/003791
PCT Pub. Date: Jan. 2, 2020

(65) Prior Publication Data
US 2021/0269114 A1    Sep. 2, 2021

(30) Foreign Application Priority Data
Jun. 25, 2018  (JP) .................................. 2018-119700

(51) Int. Cl.
*B62J 50/22* (2020.01)
*B60R 11/02* (2006.01)
(Continued)

(52) U.S. Cl.
CPC ........... *B62J 50/22* (2020.02); *B60R 11/0229* (2013.01); *B62J 50/225* (2020.02);
(Continued)

(58) Field of Classification Search
None
See application file for complete search history.

(56) References Cited

U.S. PATENT DOCUMENTS

| 5,266,930 A | 11/1993 | Ichikawa et al. |
| 2002/0001066 A1 | 1/2002 | Kobayashi |

(Continued)

FOREIGN PATENT DOCUMENTS

| CN | 1333626 A | 1/2002 |
| CN | 102203659 A | 9/2011 |

(Continued)

OTHER PUBLICATIONS

International Search Report issued in International Patent Application No. PCT/JP2019/019422 dated Jul. 16, 2019 and English translation of same. 6 pages.

(Continued)

*Primary Examiner* — Samira Monshi
(74) *Attorney, Agent, or Firm* — K&L Gates LLP

(57) ABSTRACT

An object is to provide a screen image projection system for moving object having a smaller and/or lighter head-mounted part.
The present technology provides a screen image projection system for moving object (100) including a screen image projection device (101) mounted on a moving object, and an optical element for screen image display light diffraction (103) arranged in front of human eyes that move along with the moving object, the optical element for screen image display light diffraction (103) diffracting screen image display light projected from the screen image projection device (Continued)

(101) and causing the screen image display light to reach the human eyes. The present technology also provides a component of the screen image projection system and a method for projecting a screen image in the screen image projection system.

18 Claims, 12 Drawing Sheets

(51) Int. Cl.
*B62J 50/21* (2020.01)
*B60R 11/00* (2006.01)

(52) U.S. Cl.
CPC ... *B60R 2011/004* (2013.01); *B60R 2300/205* (2013.01); *B60R 2300/8046* (2013.01); *B60R 2300/8066* (2013.01); *B60Y 2200/12* (2013.01); *B60Y 2400/92* (2013.01)

(56) References Cited

U.S. PATENT DOCUMENTS

| | | | |
|---|---|---|---|
| 2002/0060649 | A1 | 5/2002 | Perlman |
| 2006/0187421 | A1 | 8/2006 | Hattori et al. |
| 2010/0141905 | A1 | 6/2010 | Burke |
| 2015/0123878 | A1 | 5/2015 | Kawasaki |
| 2016/0044276 | A1* | 2/2016 | Shearman ............... A42B 3/042 348/207.1 |
| 2016/0127718 | A1 | 5/2016 | Hulsey et al. |

FOREIGN PATENT DOCUMENTS

| | | |
|---|---|---|
| CN | 103728727 A | 4/2014 |
| CN | 105334627 A | 2/2016 |
| CN | 108121069 A | 6/2018 |
| EP | 0574005 A2 | 12/1993 |
| EP | 3050752 A1 | 8/2016 |
| JP | 3-186489 A | 8/1991 |
| JP | H03186489 A | 8/1991 |
| JP | H08223509 A | 8/1996 |
| JP | H09156560 A | 6/1997 |
| JP | H1164782 A | 3/1999 |
| JP | 2001013450 A | 1/2001 |
| JP | 2002-302822 | 10/2002 |
| JP | 2006-098820 A | 4/2006 |
| JP | 2007140173 A | 6/2007 |
| JP | 2007-193070 | 5/2010 |
| JP | 2010-243940 A | 10/2010 |
| JP | 2015138051 A | 7/2015 |
| JP | 2015-148665 A | 8/2015 |
| JP | 2015148665 A | 8/2015 |
| JP | 2016-070915 A | 5/2016 |
| JP | 2018-012439 A | 1/2018 |
| WO | WO2015/177833 A1 | 11/2015 |

OTHER PUBLICATIONS

Written Opinion issued in International Patent Application No. PCT/JP2019/019422 dated Jul. 16, 2019. 4 pages.

Notice to Grant Patent Right issued in related Chinese Patent Application No. 201980041168.8 on Feb. 26, 2024. 5 pages.

* cited by examiner (a)

(b)

(a)

(b)

(a)         (b)

(a)         (b)

SCREEN IMAGE PROJECTION SYSTEM FOR MOVING OBJECT, SCREEN IMAGE PROJECTION DEVICE, OPTICAL ELEMENT FOR SCREEN IMAGE DISPLAY LIGHT DIFFRACTION, HELMET, AND METHOD FOR PROJECTING SCREEN IMAGE

TECHNICAL FIELD

The present technology relates to a screen image projection system for moving object, a screen image projection device, an optical element for screen image display light diffraction, a helmet, and a method for projecting a screen image. More specifically, the present technology relates to a screen image projection system for moving object including a screen image projection device mounted on a moving object and an optical element for screen image display light diffraction that is separated from the screen image projection device, each component of the screen image projection system, and a method for projecting a screen image in the screen image projection system.

BACKGROUND ART

In recent years, attention has been focused on a technology for superimposing and displaying a screen image of, for example a map, or the like, on an external scene such as an actual landscape. The technology is also called augmented reality (AR) technology. A head-up display is an example of a product utilizing the technology. It has also been proposed to apply the technology to a helmet of an automatic two-wheeled vehicle operator.

For example, Patent Document 1 below describes a technique related to an image display device in a helmet and a helmet-mounted display in which an image is formed on a helmet visor with light emitted from the image display device by using a plurality of optical systems.

For example, Patent Document 2 below describes a helmet-mounted display system for two-wheeled vehicle that is a helmet including a display unit and a control unit, and a technique related to a method for controlling the display.

CITATION LIST

Patent Document

Patent Document 1: Japanese Patent Application Laid-Open No. 2007-193070
Patent Document 2: Japanese Patent Application Laid-Open No. 2002-302822

SUMMARY OF THE INVENTION

Problems to be Solved by the Invention

In order for an automatic two-wheeled vehicle passenger to utilize an augmented reality technology, it is conceivable that optical equipment to guide light from a light source to eyes, a battery, and a control device are incorporated in a helmet. However, a helmet in which these components are incorporated is heavy. Therefore, such a helmet imposes a greater burden on a user.

Furthermore, a helmet is for protecting a head of a passenger in a case of an accident. However, in a case where various kinds of devices are mounted inside the helmet, these devices may cause head damage.

Given the above, an object of the present technology is to provide a novel method for a passenger of a moving object to utilize an augmented reality technology.

Solutions to Problems

The present technology provides a screen image projection system for moving object including a screen image projection device mounted on a moving object, and an optical element for screen image display light diffraction arranged in front of human eyes that move along with the moving object, the optical element for screen image display light diffraction diffracting screen image display light projected from the screen image projection device and causing the screen image display light to reach the human eyes.

According to one embodiment of the present technology, the screen image projection device may be arranged on the moving object such that an optical path from the screen image projection device to the optical element forms an angle of 10 degrees or larger to upward or downward with respect to a traveling direction of the moving object.

According to one embodiment of the present technology, the screen image projection device may be arranged at a position lower than the human eyes.

According to one embodiment of the present technology, the screen image projection device may be arranged on the moving object such that an optical path from the light source unit to an optical element for screen image light diffraction and an optical path from a rearward confirmation mirror of the moving object to the human eyes or to the optical element for screen image light diffraction do not overlap with each other.

According to one embodiment of the present technology, the screen image projection device may be able to change a direction of the screen image display light.

According to one embodiment of the present technology, a pedestal for mounting the screen image projection device on the moving object may be further included, the pedestal being able to change a direction of the screen image display light.

According to one embodiment of the present technology, a vibration damping unit for damping vibration derived from the moving object may be further included.

According to one embodiment of the present technology, an imaging device for capturing a screen image of behind the moving object may be further included, and the screen image projection device may present a screen image of behind captured by the imaging device to the human.

According to one embodiment of the present technology, the moving object may be a vehicle.

According to one embodiment of the present technology, the moving object may be a two-wheeled vehicle.

According to one embodiment of the present technology, the optical element may be mounted on a helmet or glasses worn by the human.

According to one embodiment of the present technology, the optical element may be mounted on a helmet shield or inner visor of a helmet worn by the human.

The optical element may be an optical element molded as a part of a helmet shield or inner visor of a helmet worn by the human.

Furthermore, the present technology provides, as the optical element for screen image display light diffraction, a plurality of optical elements for screen image display light diffraction having different optical characteristics, or an optical element for screen image display light diffraction having a plurality of regions having different optical characteristics.

Furthermore, the present technology provides a screen image projection device mounted on a moving object, the screen image projection device projecting screen image display light toward an optical element for screen image display light diffraction arranged in front of human eyes that move along with the moving object.

Furthermore, the present technology provides an optical element for screen image display light diffraction used for diffracting screen image display light projected from a screen image projection device mounted on a moving object and causing the screen image display light to reach human eyes that move along with the moving object.

Furthermore, the present technology provides a helmet including an optical element for screen image display light diffraction used for diffracting screen image display light projected from a screen image projection device mounted on a moving object and causing the screen image display light to reach human eyes that move along with the moving object.

Furthermore, the present technology provides a method for projecting a screen image on a moving object, the method including a projection step of projecting screen image display light from a screen image projection device mounted on a moving object toward an optical element for screen image display light diffraction arranged in front of human eyes that move along with the moving object, and a diffraction step of diffracting the screen image display light projected in the projection step and causing the screen image display light to reach the human eyes.

Effects of the Invention

The present technology provides a shielded helmet having a smaller and/or lighter head-mounted part and a screen image projection system for moving object using the shielded helmet. As a result, a passenger can provide screen image necessary for a user without burden by a further head-mounted part. Effects of the present technology are not necessarily limited to the effects described here, and may be any of the effects described in this specification.

MODES FOR CARRYING OUT THE INVENTION

Figure 1:
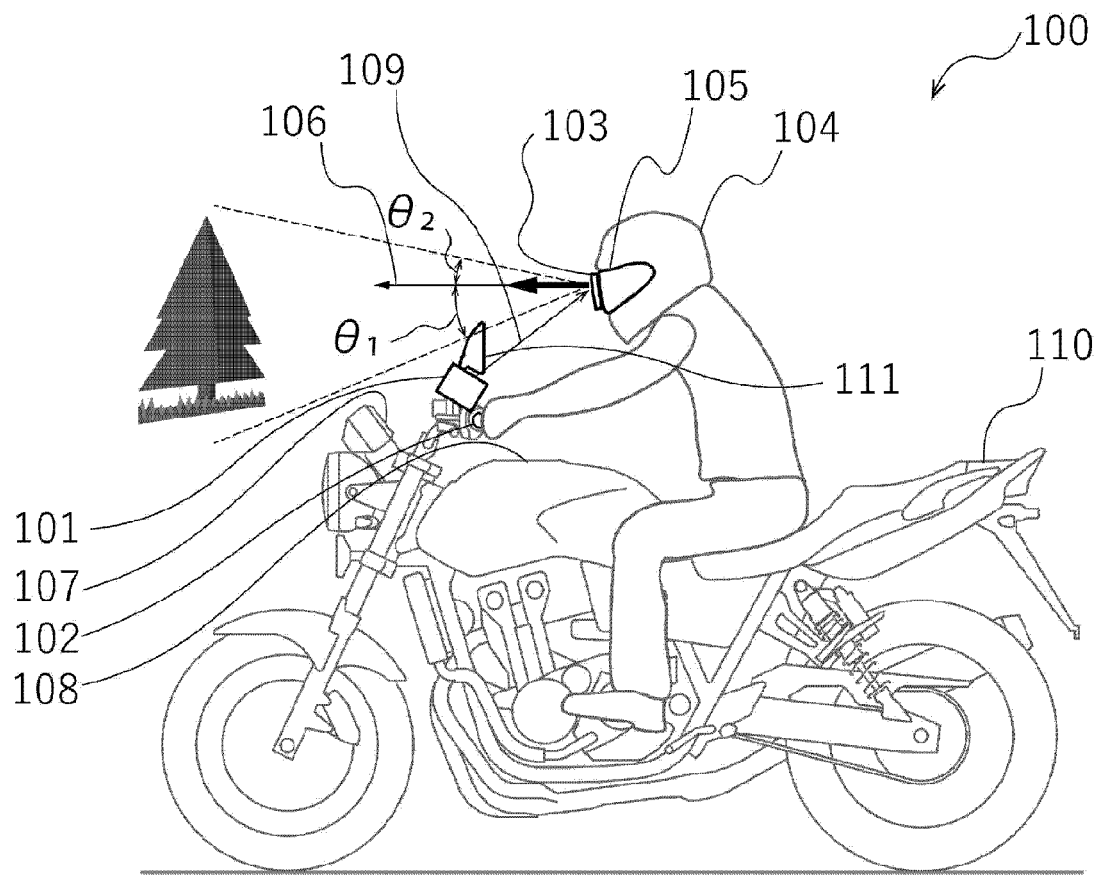
FIG. 1 is a schematic diagram illustrating a state in which a user is utilizing a screen image projection system for moving object according to the present technology.

Hereinafter, preferred embodiments for carrying out the present technology will be described. Note that the embodiments described below are typical embodiments of the present technology, and the present technology is not limited to these embodiments. Note that the present technology will be described below in the following order.

1. First embodiment (screen image projection system for moving object)
  (1) Description of first embodiment
  (2) First example of first embodiment (example of screen image projection system)
  (2-1) Example of position of screen image projection device mounted on moving object
  (2-2) Screen image projection device
  (2-3) Optical element for screen image display light diffraction
  (3) Second example of first embodiment (example of configuration for dealing with change in position of optical element for screen image display light diffraction)
  (4) Third example of first embodiment (example of configuration for dealing with vibration of moving object)

(5) Fourth example of first embodiment (example related to use of system according to present technology as alternative to mirror)

2. Second embodiment (screen image projection device)

3. Third embodiment (optical element for screen image display light diffraction)

4. Fourth embodiment (helmet including optical element for screen image display light diffraction)

5. Fifth embodiment (method for projecting screen image)

1. First embodiment (screen image projection system for moving object)

(1) Description of First Embodiment

A screen image projection system for moving object according to the present technology includes a screen image projection device mounted on a moving object, and an optical element for screen image display light diffraction arranged in front of human eyes that move along with the moving object, the optical element for screen image display light diffraction diffracting screen image display light projected from the screen image projection device and causing the screen image display light to reach the human eyes. That is, the screen image display light from the screen image projection device reaches eyes of a user who utilizes a system according to the present technology via the optical element for screen image display light diffraction. With this arrangement, a screen image is presented to the user.

Furthermore, in the screen image projection system according to the present technology, the screen image projection device is mounted on a moving object, while the optical element for screen image display light diffraction is arranged in front of human eyes. That is, the screen image projection device and the optical element for screen image display light diffraction are used separately. Therefore, only an optical element for screen image light diffraction is required be arranged in front of the human eyes, and a device (for example, a power supply, a light source or the like) necessary for projecting screen image display light is not required to be held at a human head. Therefore, equipment worn on the human head can be lighter and/or smaller. Furthermore, for example, a screen image projection system according to the present technology can be easily used only by adding the optical element for screen image light diffraction to a commercially available helmet or goggles.

In the present technology, the moving object includes a vehicle and a conveyance other than vehicles. The vehicle includes a saddle-ride type vehicle. The saddle-ride type vehicle is a vehicle that moves in a state where a driver or a fellow passenger rides on the vehicle in a posture of straddling a saddle. The saddle-ride type vehicle may be, for example, a two-wheeled, three-wheeled, or four-wheeled saddle-ride type vehicle, and more specifically, for example, a bicycle, a tricycle, an automatic two-wheeled vehicle, or an automatic three-wheeled vehicle. The vehicle includes a vehicle other than saddle-ride type vehicles. The vehicles other than saddle-ride type vehicles may be, for example, two-wheeled, three-wheeled, or four-wheeled vehicles, and include, for example, a passenger vehicle, truck, and bus. The conveyance other than vehicles includes an aircraft and a ship. In the present technology, a moving object is preferably a saddle-ride type vehicle, and more preferably an automatic two-wheeled vehicle.

(2) First Example of First Embodiment (Example of Screen Image Projection System)

An example of the screen image projection system for moving object according to the present technology will be described below with reference to FIG. 1. FIG. 1 is a schematic diagram illustrating a state in which a human (user) who drives an automatic two-wheeled vehicle is utilizing a screen image projection system for moving object according to the present technology. A screen image projection system for moving object 100 illustrated in FIG. 1 includes a screen image projection device 101 and an optical element for screen image display light diffraction 103. The screen image projection device 101 is mounted at a center between handlebars 102 for steering an automatic two-wheeled vehicle 110 of a saddle-ride type. The optical element for screen image display light diffraction 103 is attached to a shield 105 of a shielded helmet 104 worn on a head of the user who drives the automatic two-wheeled vehicle 110. With this arrangement, the optical element for screen image display light diffraction 103 is arranged in front of the eyes of the user. The optical element for screen image display light diffraction 103 and the shield 105 are transparent, and the user can perceive an external landscape through the optical element for screen image display light diffraction 103 and shield 105.

The screen image projection device 101 projects screen image display light toward the optical element for screen image display light diffraction 103. The optical element for screen image display light diffraction 103 diffracts the screen image display light projected from the screen image projection device 101 and causes the screen image display light to reach the eyes of the user. With this arrangement, the user perceives a screen image.

Furthermore, because the optical element for screen image display light diffraction 103 is transparent, light from the external landscape reaches the eyes of the user through the optical element for screen image display light diffraction 103. With this arrangement, the user perceives the external landscape.

As described above, because the screen image display light and light from outside reach the eyes of the user, the user perceives the external landscape on which the screen image is superimposed.

Figure 2:
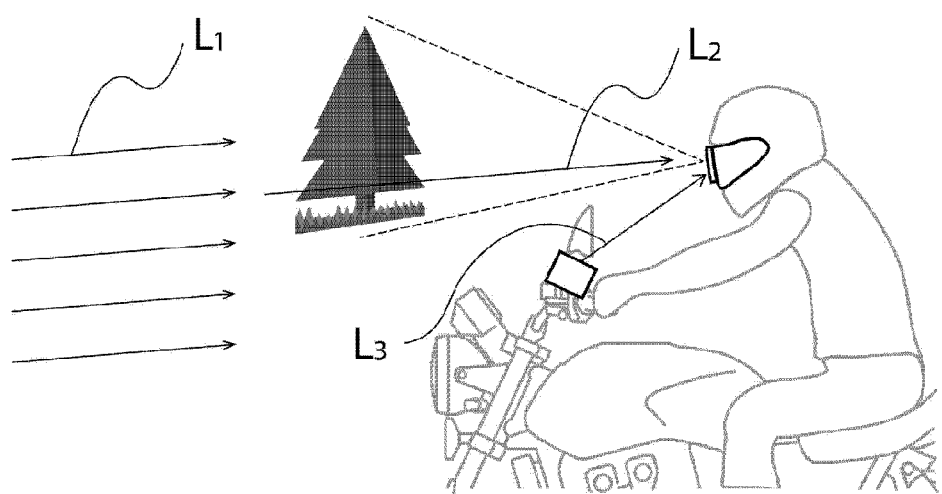
FIG. 2 is a diagram illustrating a direction of light from an oncoming vehicle and a direction of screen image display light.

(2-1) Example of Position of Screen Image Projection Device Mounted on Moving Object The screen image projection device 101 is arranged on the automatic two-wheeled vehicle 110 such that an optical path 109 of screen image display light from the screen image projection device 101 to the optical element for screen image display light diffraction 103 forms an angle $\theta_1$ to downward with respect to a traveling direction 106 of the automatic two-wheeled vehicle 110. The angle $\theta_1$ may be preferably 10 degrees or larger, more preferably 20 degrees or larger, and even more preferably 30 degrees or larger. Thus, by screen image display light being projected from below in the traveling direction of the user, an optical path of the screen image display light does not overlap with an optical path of an external landscape in a direction of a line of sight of a user who moves. Therefore, influence of external light on a screen image is reduced, and the screen image is easier to perceive. Furthermore, for example, in a case where the moving object is an automatic two-wheeled vehicle, the screen image does not overlap with light from an oncoming vehicle. In a case where the angle $\theta_1$ is too small, for example, as illustrated in FIG. 2, light $L_1$ from the oncoming vehicle and light $L_2$ from the screen image projection device overlap with each other, while light $L_3$ from the screen image projection device does not overlap with the light $L_1$ from the oncoming vehicle due to the angle $\theta_1$ being larger than a lower limit value described above.

The angle $\theta_1$ may be more preferably 10 degrees to 60 degrees, even more preferably 20 degrees to 60 degrees, and particularly preferably 30 degrees to 60 degrees. Because there may be a case where it is difficult to manufacture an optical element for screen image display light diffraction, which causes screen image display light that enters at an angle exceeding these upper limit values to reach eyes, the angle is preferably equal to or smaller than these upper limit values.

The screen image projection device 101 may be arranged on, for example, the handlebars 102, a meter panel 107, or a gasoline tank 108. By arranging the screen image projection device 101 on such a portion, the angle $\theta_1$ formed by the optical path and the traveling direction can be set within a range of the above-described values.

In the screen image projection system for moving object according to the present technology, the screen image projection device may be arranged on the moving object such that an optical path from the screen image projection device to the optical element for screen image display light diffraction forms an angle $\theta_2$ to upward with respect to a traveling direction of a moving object. The angle $\theta_2$ may be preferably 10 degrees or larger, and more preferably 20 degrees or larger. With this arrangement, an optical path of screen image display light does not overlap with an optical path of an external landscape. Therefore, influence of external light on a screen image is reduced, and the screen image is easier to perceive. The angle $\theta_2$ may be more preferably 10 degrees to 60 degrees, and even more preferably 20 degrees to 50 degrees. Because there may be a case where it is difficult to manufacture an optical element for screen image display light diffraction, which causes screen image display light that enters at an angle exceeding these upper limit values to reach eyes, the angle is preferably equal to or smaller than these upper limit values. This arrangement is suitable for a case where, for example, the moving object is an automobile or a covered automatic two-wheeled vehicle, or the like, that is, the screen image projection device may be arranged above a direction of a line of sight of the user who moves (for example, arranged on a ceiling portion inside the automobile, or the like).

In FIG. 1, the screen image projection device 101 is arranged at a position lower than the eyes of the user. Thus, according to a preferred embodiment of the present technology, the screen image projection device may be arranged at a position lower than the eyes of the user. With this arrangement, the screen image display light does not overlap with sunlight or moonlight, and the user can easily perceive the screen image from the screen image display light.

According to one embodiment of the present technology, the screen image projection device may be arranged on the moving object such that an optical path from the screen image projection device to the optical element for screen image light diffraction and an optical path from a rearward confirmation mirror of the moving object to the human eyes or to the optical element for screen image light diffraction do not overlap with each other.

For example, in a case where the moving object is an automatic two-wheeled vehicle, the rearward confirmation mirror is, for example, a mirror 111 arranged in vicinity of the handlebars 102 as illustrated in FIG. 1.

For example, in a case where the moving object is an automobile, the rearward confirmation mirror is, for example, a side mirror or a rear view mirror.

Figure 3:
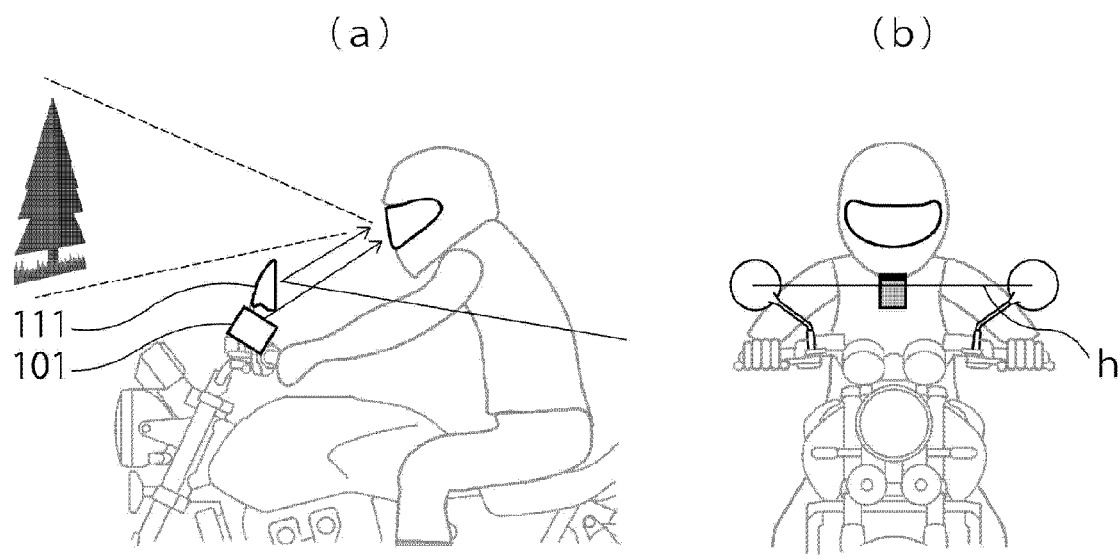
FIG. 3 is a diagram illustrating a positional relation between a screen image projection device and a rearward confirmation mirror.

The screen image projection device may be arranged, for example, at a position lower than the rearward confirmation mirror so that an optical path from the screen image projection device to the optical element for screen image light diffraction does not overlap with an optical path from the rearward confirmation mirror of the moving object to the human eyes or to the optical element for screen image light diffraction. For example, as illustrated in FIG. 3(a), the screen image projection device 101 is arranged at a position lower than the mirror 111 for rearward confirmation. The arrangement may improve visibility of outside.

For example, as illustrated in FIG. 3(b), in a case where the screen image projection device is arranged at the same height as the rearward confirmation mirror, light such as a headlight of a vehicle behind may be guided via the rearward confirmation mirror to the optical element for screen image display light diffraction, for example. In this case, there is a possibility that eyes are dazzled by the light, by which visibility of the outside may be reduced, or the eyes may be damaged.

For example, in a case where the moving object is an automatic two-wheeled vehicle, the screen image projection device may be arranged in a position anterior to the human eyes and on the moving object and may be arranged, for example, on a meter panel, a gasoline tank, handlebars, or a cowl, so that an optical path from the screen image projection device to the optical element for screen image light diffraction and an optical path from a rearward confirmation mirror of the automatic two-wheeled vehicle to the human eyes or to the optical element for screen image light diffraction do not overlap with each other.

For example, in a case where the moving object is an automobile, the screen image projection device may be arranged, for example, on an interior part of the automobile, more specifically, on an instrument panel, a console, a front window, or a ceiling in the automobile, so that an optical path from the screen image projection device to the optical element for screen image light diffraction and an optical path from a rearward confirmation mirror of the automobile to the human eyes or to the optical element for screen image light diffraction do not overlap with each other.

Figure 4:
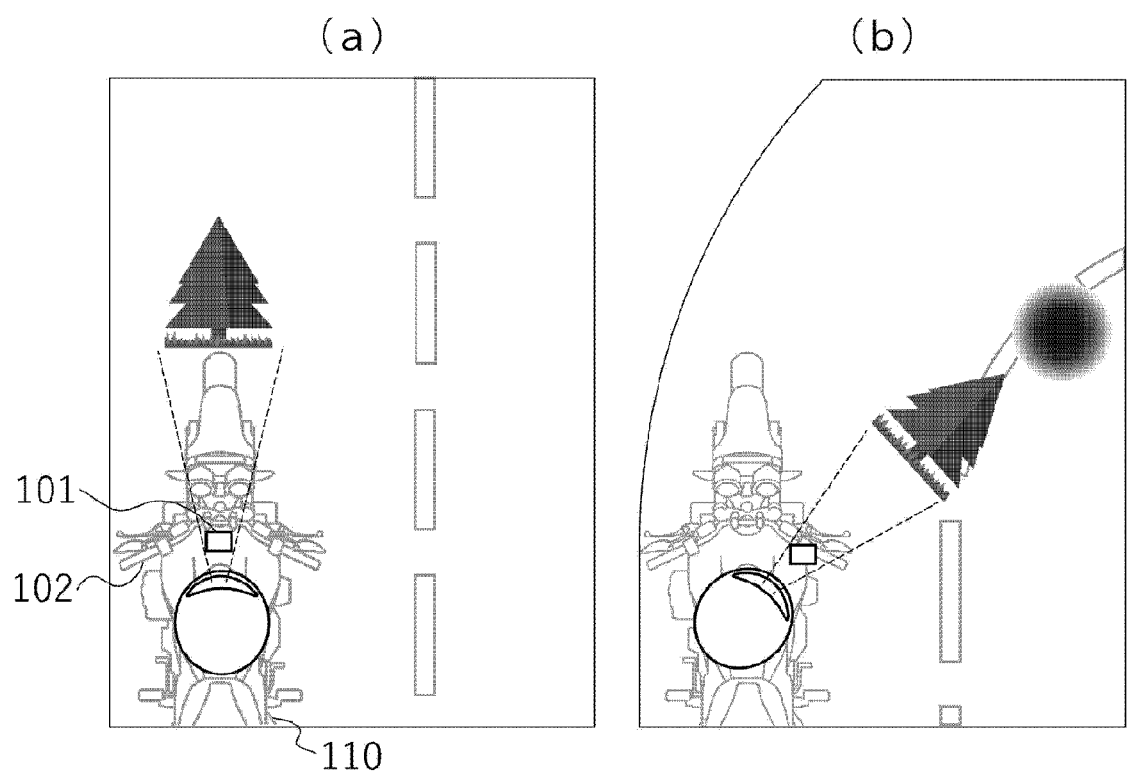
FIG. 4 is a diagram illustrating an example of arrangement of the screen image projection device according to the present technology.

According to a preferred embodiment of the present technology, the screen image projection device may be arranged anterior to the optical element. For example, the screen image projection device may be arranged on the moving object such that an optical path from the screen image projection device to the optical element forms an angle of 60 degrees or smaller, preferably 30 degrees or smaller, more preferably 20 degrees or smaller, and even more preferably 10 degrees or smaller in a horizontal direction with respect to a traveling direction of the moving object. The angle means an angle on a left side or a right side in a horizontal direction with respect to the traveling direction of the moving object. For example, as illustrated in FIG. 4(a), the screen image projection device 101 is mounted at a center between the handlebars 102 for steering the automatic two-wheeled vehicle 110, that is, the screen image projection device 101 is mounted on the automatic two-wheeled vehicle 110 such that the optical path forms an angle of about 0 degrees in the horizontal direction with respect to a traveling direction of the automatic two-wheeled vehicle 110. By the screen image projection device according to present technology being arranged in this way, screen image display light does not reach eyes of the user in a case where the user confirms a side or back when the moving object is making a turn, and thus the screen image display light does not interrupt the confirmation of the side or back.

For example, as illustrated in FIG. 4(b), in a case where the screen image projection device is arranged on the moving object such that an optical path from the screen image projection device to the optical element forms an angle larger than an upper limit value described above with respect to a traveling direction of the moving object, confirmation of a side or back by the user may be interrupted when the moving object is making a turn.

(2-2) Screen Image Projection Device

Figure 5:
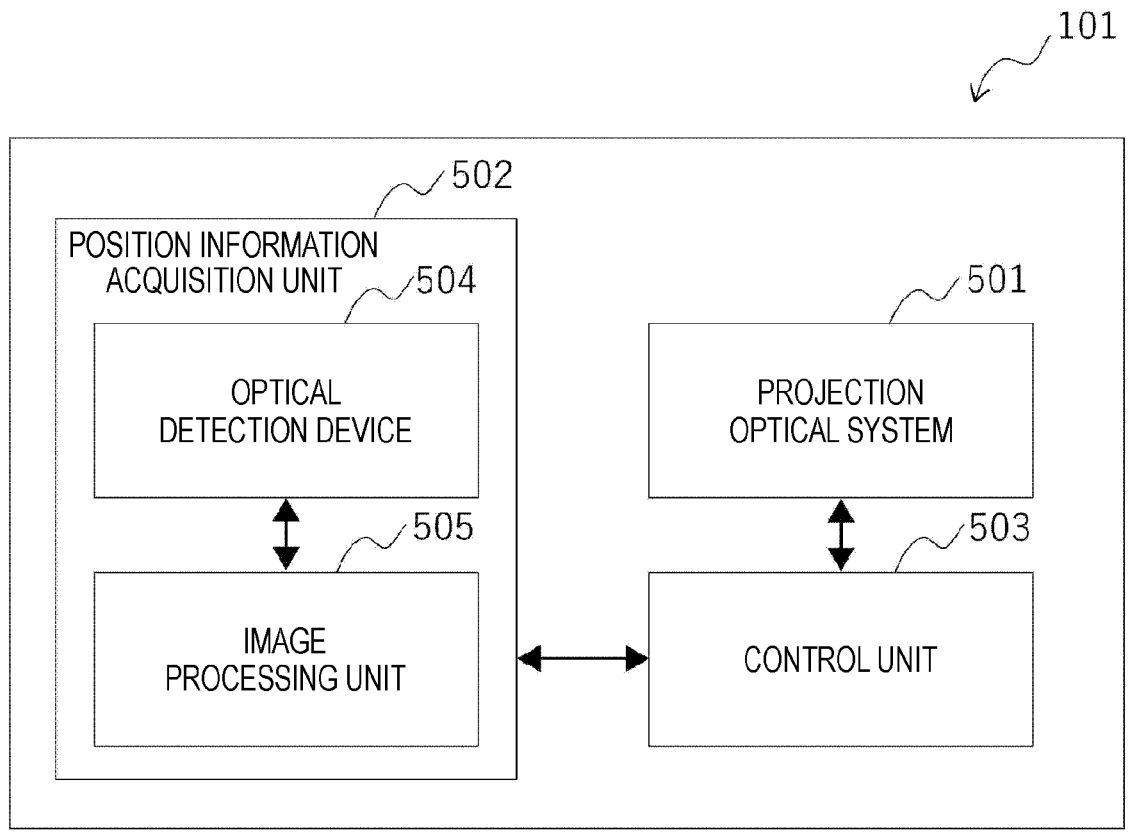
FIG. 5 is an example of a block diagram of the screen image projection device according to the present technology.

An example of the screen image projection device 101 will be described with reference to FIG. 5. FIG. 5 is an example of a block diagram of the screen image projection device 101. As illustrated in FIG. 5, the screen image projection device 101 includes a projection optical system 501, a position information acquisition unit 502, and a control unit 503.

The projection optical system 501 is configured so that screen image display light can be projected toward the optical element for screen image display light diffraction 103. A type of a projection optical system adopted in the present technology may be selected as appropriate by those skilled in the art according to, for example, a product concept, or the like.

Figure 6:
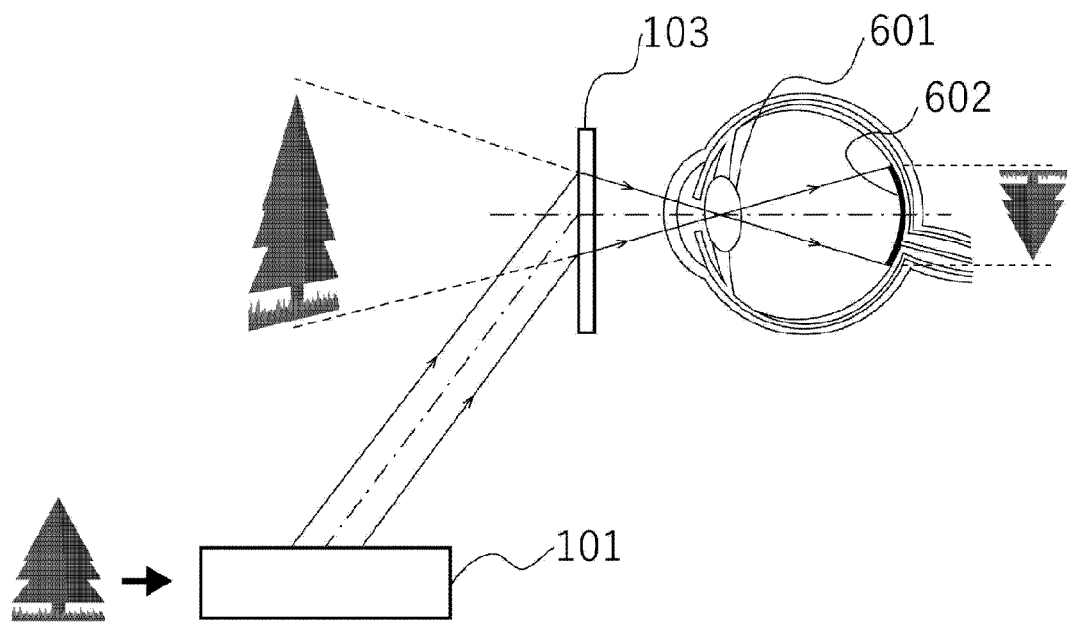
FIG. 6 is a diagram illustrating a screen image presented to a user by the Maxwellian view.

According to one embodiment of the present technology, the projection optical system 501 may be configured such that screen image display light is focused near a pupil and then emitted to a retina. That is, screen image display light may be projected to eyes by so-called the Maxwellian view. Presentation of a screen image by the Maxwellian view to the user will be described with reference to FIG. 6. In FIG. 6, screen image display light projected form the screen image projection device 101 is diffracted by the optical element for screen image display light diffraction 103. The diffracted screen image display light is focused on a center of a pupil (crystalline lens) 601, and then reaches a retina 602. In a Maxwellian-view optical system, one dot (minimum display unit) in a displayed screen image passes through one point on the crystalline lens, and therefore, an image of one dot on the retina is less likely to be influenced by a state of the crystalline lens. For example, even a user having myopia, hyperopia, astigmatism, or the like can clearly perceive a screen image. Furthermore, a virtual image floating in space is focus-free, and the virtual image is in focus regardless of a distance from the eyes. In the Maxwellian-view optical system, screen image display light may be focused near a pupil, for example, may be focused on the pupil, or may shift from the pupil in an optical axis direction by about a few mm to a dozen mm (for example, 1 mm to 20 mm, in particular, 2 mm to 15 mm). As in the latter case, the Maxwellian view can be achieved even if a focal point is not on the pupil. By shifting a focal point in the optical axis direction, it is possible to reduce chances of the user losing sight of the screen image even if the screen image is deviated. More specifically, the screen image display light may be focused on the pupil, in the crystalline lens, or between a corneal surface and the pupil.

A projection optical system that projects screen image display light by the Maxwellian-view optical system may include, for example, a light source unit that outputs laser light and an optical scanning unit that two-dimensionally scans the output laser light. The laser light may be output as one light flux including red, green, and blue laser light, for example. The optical scanning unit may include, for example, a micro electro mechanical systems (MEMS) mirror. The optical scanning unit may move a direction of the laser light at high speed so that a screen image is formed on the retina.

According to another embodiment of the present technology, the screen image display light projected from the screen image projection device 101 may be emitted as parallel light to the human eyes. In this case, the screen image display light passes through an entire pupil. The screen image display light is refracted by the crystalline lens and focused on the retina.

The position information acquisition unit 502 may include, for example, an optical detection device 504, such as an image sensor, and an image processing unit 505. As the image sensor, for example, CMOS or CCD may be used. The optical detection device 504 may acquire, for example, an image of the optical element for screen image display light diffraction 103. From the image, the image processing unit 505 acquires position information of the optical element for screen image display light diffraction 103. With this arrangement, the position of the optical element for screen image display light diffraction 103 can be tracked.

The control unit 503 controls the screen image display light on the basis of the position information obtained by the position information acquisition unit 502. The control unit 503 may control the screen image display light so as to, for example, present a desired screen image to the user, and more specifically, may adjust any one or more of a wavelength, intensity, and a direction of the screen image display light. In a case where a position of the optical element for screen image display light diffraction is changed by control of the screen image display light, the screen image display light can be projected at the changed position.

A configuration example of the screen image projection device 101 will be described with reference to FIG. 7.

Figure 7:
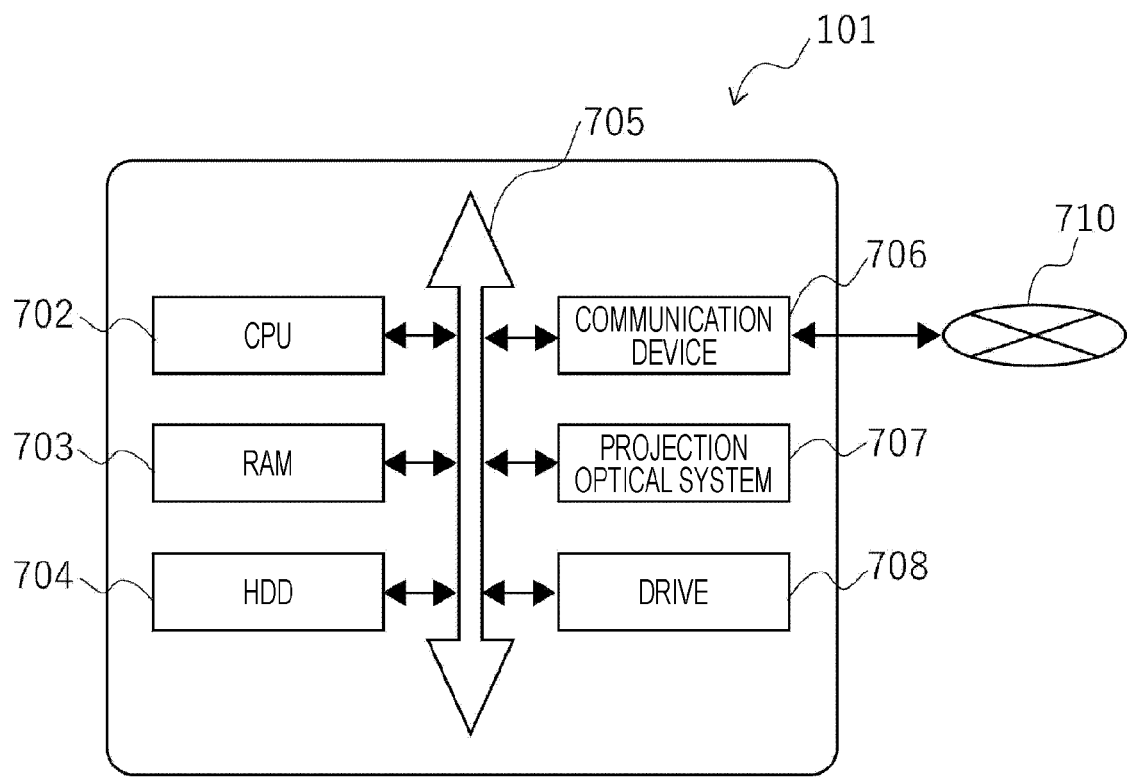
FIG. 7 is a diagram illustrating a configuration example of the screen image projection device according to the present technology.

The screen image projection device 101 illustrated in FIG. 7 may include a central processing unit (CPU) 702 and a RAM 703. The CPU 702 and the RAM 703 are connected to each other via a bus 705, and may also be connected to another component of the screen image projection device 101 via the bus 705.

The CPU 702 may control and calculate the screen image projection device 101. Any processor can be used as the CPU 702, and examples thereof include processors of Snapdragon (trademark) series, Xeon (registered trademark) series, Core (trademark) series, or Atom (trademark) series. Functions of the control unit 503 and image processing unit 505 in the screen image projection device 101 described with reference to FIG. 5 may be achieved by, for example, the CPU 702.

The RAM 703 includes, for example, a cache memory and a main memory, and may temporarily store a program, or the like, used by the CPU 702.

The screen image projection device 101 includes a projection optical system 707, and may further include a disk 704, a communication device 706, and a drive 708. Any of these components may be connected to the bus 705.

On the disk 704, an operating system (for example, Android (trademark), Windows (registered trademark), UNIX (registered trademark), Linux (registered trademark), or the like), a program for achieving a method for projecting a screen image according to the present technology, a program for performing position information acquisition processing, a program for controlling screen image display light, and various other programs, as well as various data (for example, screen image data) may be stored.

The communication device 706 may connect the screen image projection device 101 to a network 710 by wire or wirelessly. The communication device 706 can acquire various data (for example, screen image data, or the like) to the screen image projection device 101 via the network 710. The acquired data may be stored, for example, on the disk 704. A type of the communication device 706 may be selected as appropriate by those skilled in the art.

The projection optical system 707 projects screen image display light toward the optical element for screen image display light diffraction 103.

The drive 708 can read information recorded on a recording medium and output the information to the RAM 703. The recording medium is, for example, a microSD memory card, an SD memory card, or a flash memory, but is not limited to these.

(2-3) Optical Element for Screen Image Display Light Diffraction

The optical element for screen image display light diffraction 103 may preferably have an optical characteristic of diffracting only light that enters from a predetermined angle and causes the light to reach the eyes. With this arrangement, the user can visually confirm a screen image only in a case where the optical element for screen image display light diffraction 103 is at a predetermined position with respect to the screen image projection device 101. For example, the screen image may be visible only in a case where the user shifts a line of sight in a diagonally downward direction with respect to the traveling direction. With this arrangement, the user can look at the screen image only when necessary. The optical element for screen image display light diffraction 103 having the optical characteristic may be, for example, a holographic optical element (hereinafter, also referred to as HOE), and may be, for example, a hologram lens, preferably a film-shaped hologram lens, and more preferably a transparent film-shaped hologram lens. Techniques known in the art can impart a desired optical characteristic to the holographic optical element. As the holographic optical element, a commercially available holographic optical element may be used, or the holographic optical element may be manufactured by a technique known in the art.

The optical element for screen image display light diffraction 103 is arranged in front of human eyes that move along with the moving object. According to one embodiment of the present technology, for the arrangement, the optical element for screen image display light diffraction 103 is separated from the screen image projection device and may be mounted on equipment for holding the optical element in front of both the eyes. The equipment may be, for example, a helmet, goggles, or glasses.

Figure 8:
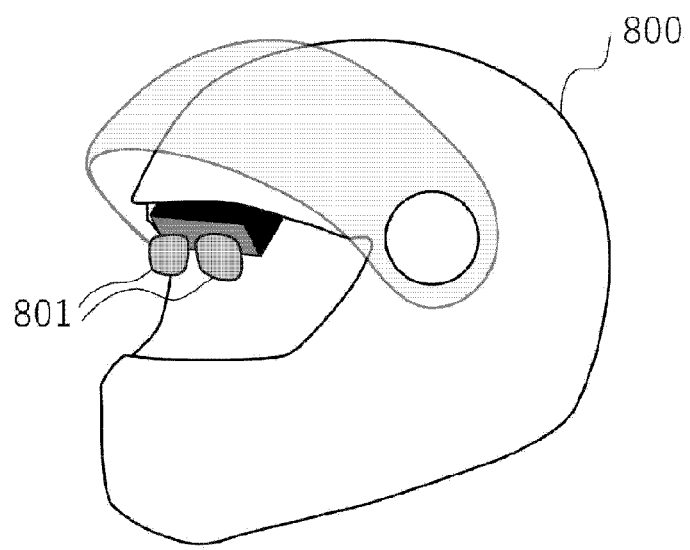
FIG. 8 is a diagram illustrating an example of a helmet including a device for projecting screen image display light.

The equipment preferably does not include a device for projecting screen image display light (for example, a light source, a power supply, a substrate, a device driven by a power supply, or the like). For example, as illustrated in FIG. 8, in a case where a device 801 for projecting screen image display light is included in a helmet 800, the device 801 may injure a head in an event of an accident. Furthermore, the device may cover a part of a field of view. According to the present technology, the equipment does not include a device for projecting screen image display light, and thus is highly safe. Furthermore, in a case where the equipment is used, a part of a field of view is not covered by the device for projecting screen image display light.

For example, the optical element for screen image display light diffraction 103 may be sheet-shaped. With this arrangement, in a case where the optical element for screen image display light diffraction 103 is attached to a helmet or glasses, the optical element for screen image display light diffraction 103 is inconspicuous.

In a case where the optical element for screen image display light diffraction 103 is mounted on a helmet, the optical element for screen image display light diffraction 103 may be mounted on, for example, a shield or inner visor of the helmet. In a case where the optical element for screen image display light diffraction 103 is mounted on glasses, the optical element for screen image display light diffraction 103 may be mounted on, for example, lenses of the glasses.

The shield or inner visor may have, for example, a dimming function. With this arrangement, it is possible to prevent deterioration of visibility under sunlight.

Figure 9:
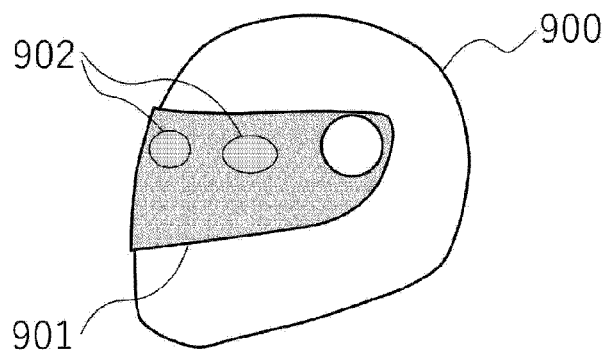
FIG. 9 is a diagram illustrating an example of a helmet in which an optical element for screen image display light diffraction is mounted on a shield.

FIG. 9 illustrates an example of a helmet in which an optical element for screen image display light diffraction is mounted on a shield. As illustrated in FIG. 9, a sheet-shaped HOE film 902, which is an optical element for screen image display light diffraction, is attached to a shield 901 of a helmet 900. Because the HOE film is transparent, a human wearing the helmet can look at an external landscape.

The HOE film 902 may be attached to a surface on an external landscape side of the shield 901, or may be attached to a surface on an eye side of the shield 901.

Although the HOE film 902 is attached to the shield 901 so as to cover each of both the eyes in FIG. 9, the HOE film 902 may be attached to the shield 901 so as to cover only one eye.

Figure 10:
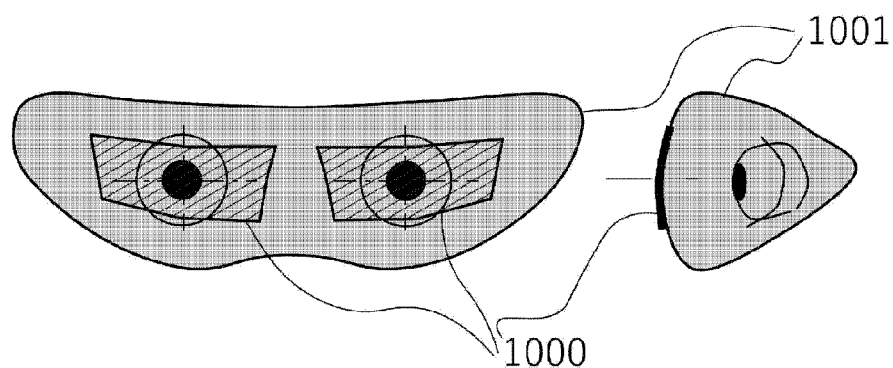
FIG. 10 is a diagram illustrating an inner visor to which an HOE film is attached.
Figure 11:
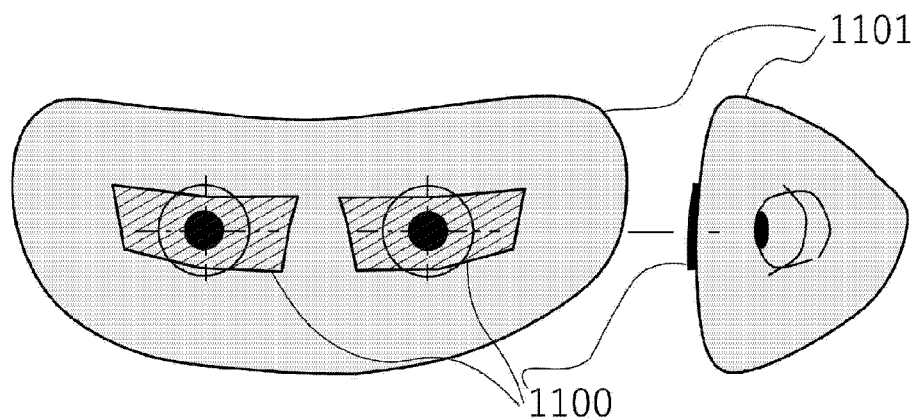
FIG. 11 is a diagram illustrating a shield to which an HOE film is attached.

The HOE film 902 may preferably be attached to the inner visor or shield of the helmet so as to be positioned in a line of sight of the eyes. For example, as illustrated in FIG. 10, an HOE film 1000 may be attached to an inner visor 1001 so as to be positioned in the line of sight of the eyes. Alternatively, as illustrated in FIG. 11, an HOE film 1100 may be attached to a shield 1101 so as to be positioned in the line of sight of the eyes.

Furthermore, the shield 901 may be configured to be able to be flipped up. With this arrangement, as necessary, an external landscape can be directly confirmed without seeing through the HOE film 902 and the shield 901.

Figure 12:
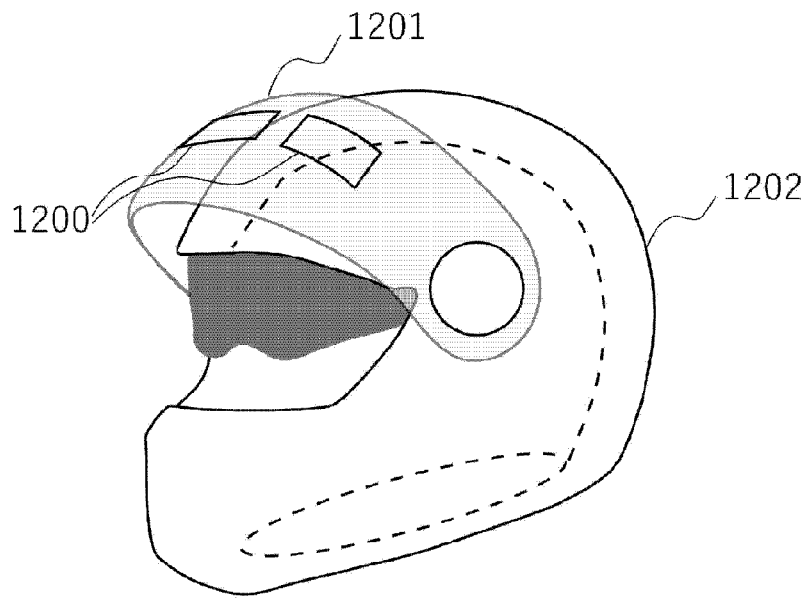
FIG. 12 is a diagram illustrating an example of a helmet in which an optical element for screen image display light diffraction is mounted on a shield.

FIG. 12 illustrates an example of a helmet in which an optical element for screen image display light diffraction is mounted on a shield. As illustrated in FIG. 12, an HOE film 1200 may be mounted on a shield 1201 of a helmet 1202. As illustrated in FIG. 12, the shield 1201 is configured to be able to be flipped up. With this arrangement, as necessary, an external landscape can be directly confirmed without seeing through the HOE film 1200 and the shield 1201.

According to another embodiment of the present technology, the optical element for screen image display light diffraction 103 may be included as a part of a shield or an inner visor. For example, by manufacturing a shield or inner visor and an optical element for screen image display light diffraction (HOE in particular) by integral molding, a shield or inner visor including an optical element can be obtained. In this embodiment, a material of the shield or inner visor (for example, resin) may be the same as material of the optical element for screen image display light diffraction.

Figure 13:
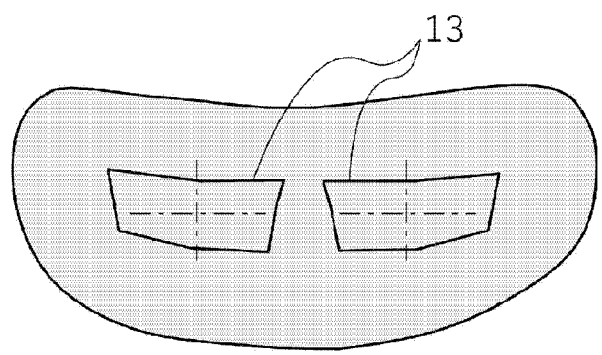
FIG. 13 is a diagram illustrating an example of an inner visor having a guide groove.

According to still another embodiment of the present technology, the optical element for screen image display light diffraction may be provided to the shield or the inner visor by applying photosensitive resin to a part of the shield or inner visor, and then curing the photosensitive resin with light. Preferably, the shield or inner visor may be provided with a guide groove or marker indicating a region to which photosensitive resin is applied. For example, as illustrated in FIG. 13, an inner visor may be provided with a guide groove 13 indicating a region to which photosensitive resin should be applied.

Particularly preferably, a refractive index of a cured material of the photosensitive resin and a refractive index of the shield or inner visor may be substantially the same. With this arrangement, a boundary face between the cured material and the shield or inner visor is difficult to visually confirm, and an external landscape can be visually confirmed more clearly.

A driver who drives an automatic two-wheeled vehicle may change a posture of own according to a driving situation. In order for the driver to be able to perceive a screen image even in a case where the posture is changed, the screen image projection system according to the present technology may include a plurality of optical elements for screen image display light diffraction for each eye to correspond to each posture. That is, the screen image projection system according to the present technology may include, as the optical element for screen image display light diffraction, a plurality of optical elements for screen image display light diffraction having different optical characteristics, or an optical element for screen image display light diffraction having a plurality of regions having different optical characteristics.

Figure 14:
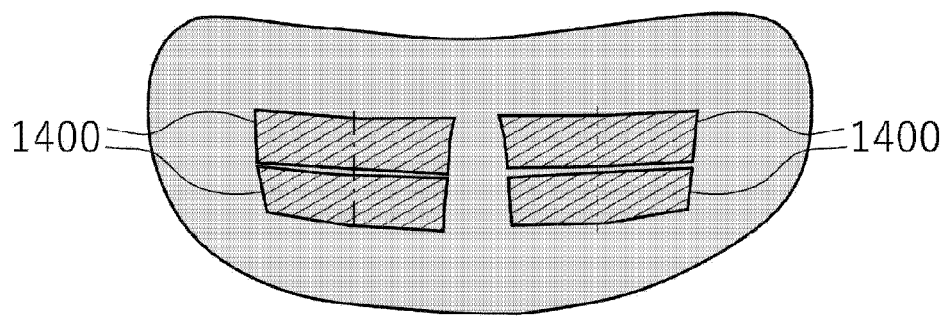
FIG. 14 is a diagram illustrating an example of a shield to which a plurality of HOE films is attached.

For example, as illustrated in FIG. 14, vertically arranged two pieces of HOE films 1400 for each eye (a total of four pieces of HOEs) may be attached to the shield or inner visor. For example, in a case where the driver is taking a low posture, screen image display light may be presented through an upper HOE film, and in a case where the driver is taking a high posture, the screen image display light may be presented through a lower HOE film.

Figure 15:
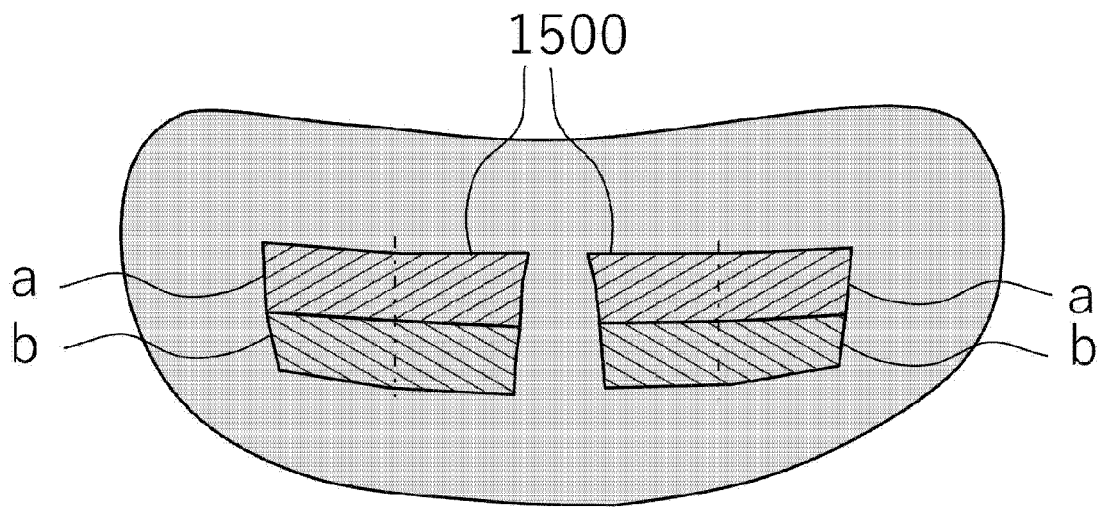
FIG. 15 is a diagram illustrating an example of an HOE film divided into two regions having different optical characteristics.

Alternatively, as illustrated in FIG. 15, one piece of HOE film 1500 corresponding to each eye may be divided into two upper and lower regions a and b, and the two regions a and b may have different optical characteristics. For example, in a case where the driver is taking a low posture, screen image display light may be presented through the upper region a, and in a case where the driver is taking a high posture, the screen image display light may be presented through the lower region b.

Figure 16:
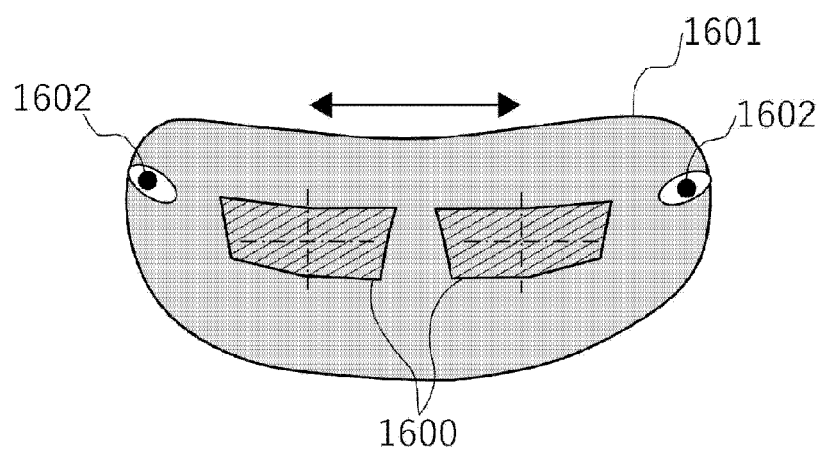
FIG. 16 is a diagram illustrating an inner visor to which an HOE film is attached, the inner visor being mounted on a helmet via pins.

According to one embodiment of the present technology, the optical element for screen image display light diffraction may be mounted on an inner visor or shield such that a position thereof with respect to an eye can be changed. For example, as illustrated in FIG. 16, an inner visor 1601 to which an HOE film 1600 is attached is mounted on a helmet via a pin 1602 fixed to the helmet. The inner visor is configured to be movable with respect to the pin. With this arrangement, the position of the HOE film can be adjusted according to a position of an eyeball or width of an eye of each user.

According to one embodiment of the present technology, the optical element for screen image display light diffraction may include a marker perceived by a position information acquisition unit of the screen image projection device.

Figure 17:
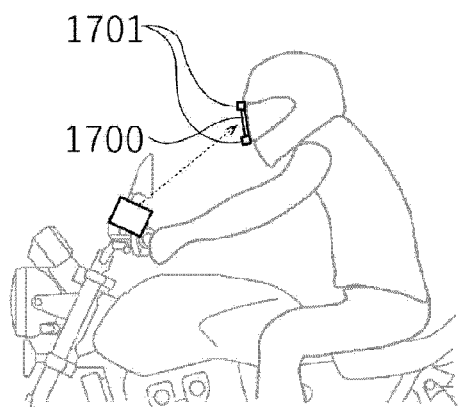
FIG. 17 is a diagram illustrating an example of marker arrangement.

For example, as illustrated in FIG. 17, markers 1701 may be provided at upper and lower sides of an optical element for screen image display light diffraction 1700. With this arrangement, the position information acquisition unit can determine a position of an optical element for screen image display light diffraction.

The markers may be, for example, a retroreflective mirror integrally molded on the shield or on the inner visor. Alternatively, the markers may be a retroreflective mirror with a corner cube.

According to one embodiment of the present technology, the optical element for screen image display light diffraction may be a HOE having a flat surface and/or a cylindrical surface. The shield or inner visor of the helmet usually has a curved surface. By arranging a HOE having a flat surface and/or a cylindrical surface on the curved surface, performance and/or quality of the HOE can be improved or stabilized.

(3) Second Example of First Embodiment
(Example of Configuration for Dealing with Change in Position of Optical Element for Screen Image Display Light Diffraction)

A driver or fellow passenger of a moving object often changes a posture. Along with the change, a position of the optical element for screen image display light diffraction is also changed. For example, in a case where the position of the optical element for screen image display light diffraction is changed by about 20 degrees with respect to the screen image projection device, screen image display light can be projected with respect to the optical element for screen image display light diffraction at the changed position by adjustment (for example, adjustment of a mirror in the projection optical system) by a projection optical system. However, in a case where the position of the optical element for screen image display light diffraction is changed more significantly, the adjustment by the projection optical system may not be sufficient. The present technology also provides a technique for dealing with change in position of the optical element for screen image display light diffraction.

According to one embodiment of the present technology, the screen image projection device is able to change a direction of screen image display light. For example, the screen image projection system according to the present technology may further include a pedestal for mounting the screen image projection device on the moving object, the pedestal being able to change a direction of screen image display light. For example, the screen image projection device may be mounted on the pedestal, and the direction of the screen image display light may be changed by changing orientation (angle) of the pedestal. The orientation of the pedestal may be changed by, for example, a control unit. For example, the control unit may change the orientation of the pedestal such that screen image display light is projected toward the position of the optical element for screen image display light diffraction acquired by the position information acquisition unit.

For example, the pedestal may be configured to be rotatable around one or more axes among X, Y, and Z axes, for example. Alternatively, the pedestal may be configured such that orientation of the pedestal is changed in all directions around one point.

Figure 18:
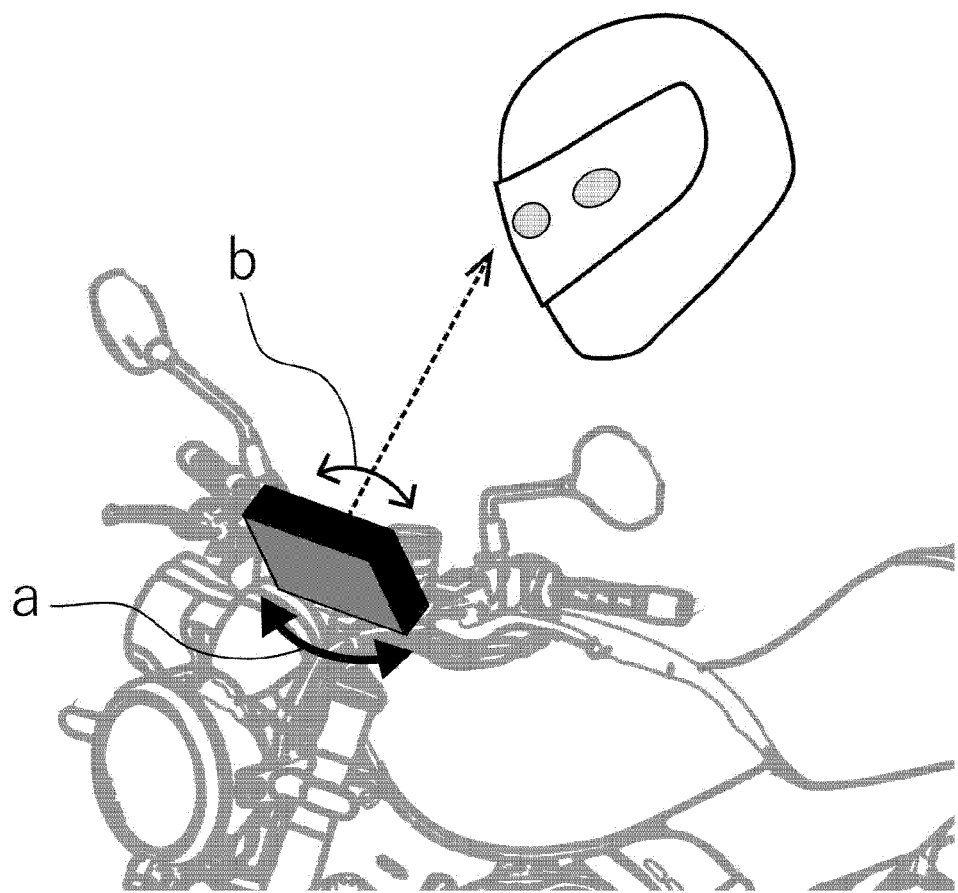
FIG. 18 is a diagram illustrating adjustment of a projection direction of screen image display light by a pedestal and a projection optical system.

For example, as illustrated in FIG. 18, the screen image projection device may roughly adjust a projection direction of the screen image display light by changing the orientation of the pedestal (a of FIG. 18), and then may finely adjust the projection direction of the screen image display light by adjustment by the projection optical system (b of FIG. 18). By such adjustment, the projection direction can be changed significantly and can be adjusted accurately.

Figure 19:
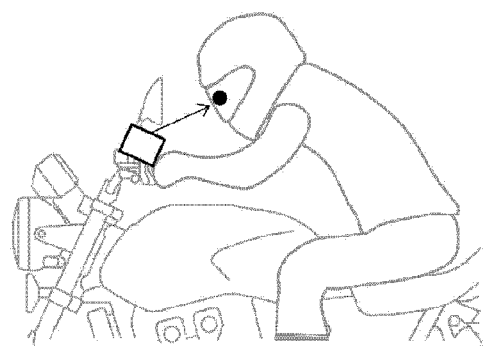
FIG. 19 is a diagram illustrating an example of a low ride position.

According to another embodiment of the present technology, the screen image projection device may be mounted on the moving object so as to be able to slide on the moving object. For example, as illustrated in FIG. 19, in a case where speed of the automatic two-wheeled vehicle is very high, a ride position is changed downward to reduce air resistance. Along with this, the optical element for screen image display light diffraction moves downward. Because a position of the screen image projection device is slidable in this embodiment, the screen image projection device slides on the moving object in a case where the ride position is changed. With this arrangement, screen image display light can be projected toward the optical element for screen image display light diffraction after the ride position is changed.

For example, in order to slide the screen image projection device, for example, a linear rail may be provided on the moving object, and a slider that moves along the rail may be provided on the rail. The screen image projection device may be mounted on the slider.

Figure 20:
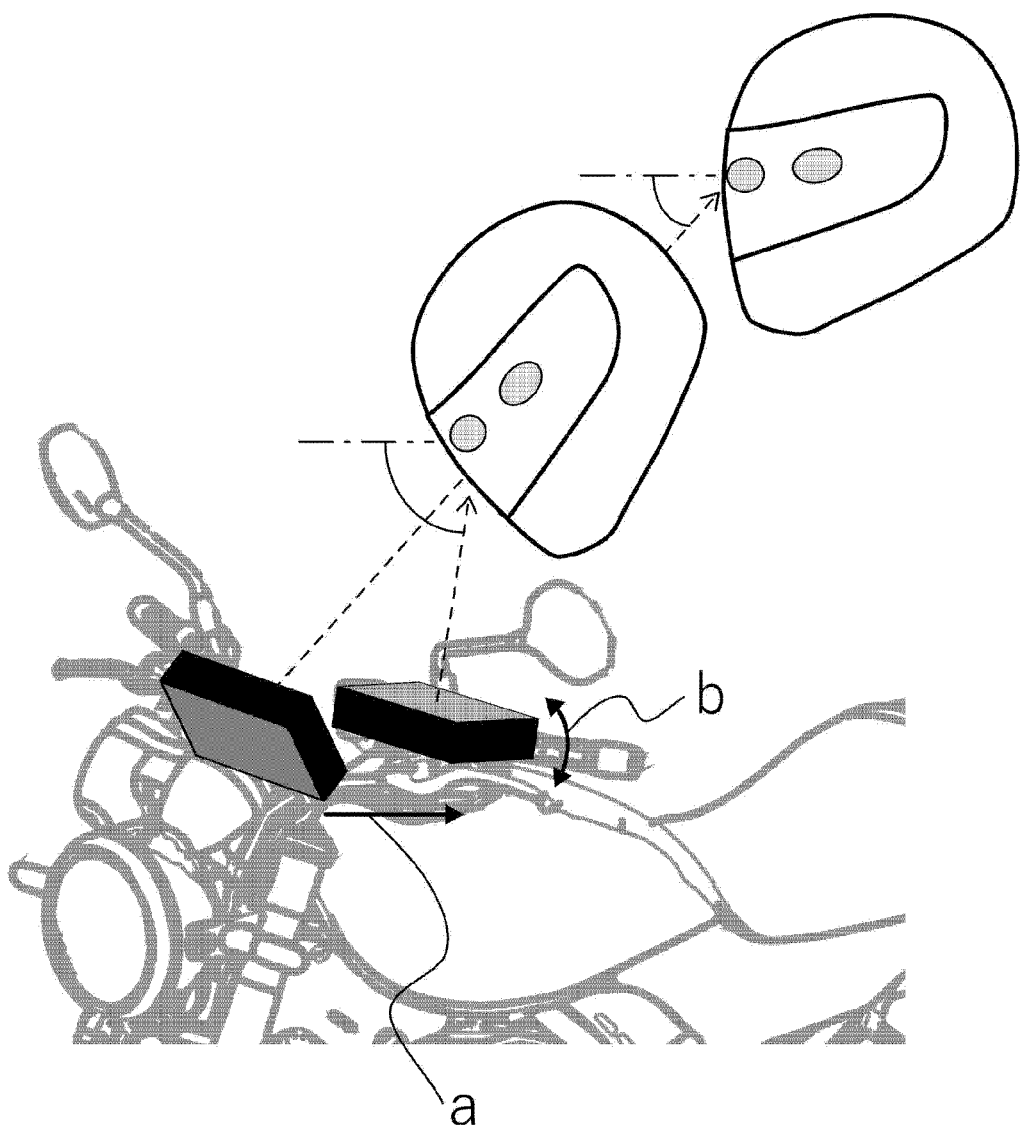
FIG. 20 is a diagram illustrating adjustment of a projection direction of screen image display light by sliding of the screen image projection device.

This embodiment may be combined with the adjustment of the projection direction of the screen image display light by changing the orientation of the pedestal described above and/or the adjustment of the projection direction of the screen image display light by the projection optical system described above. With this arrangement, it is possible to adjust the projection direction of the screen image display light more accurately. For example, as illustrated in FIG. 20, after the projection direction is adjusted by sliding the moving object (a of FIG. 20), the projection direction may be adjusted by the pedestal and/or the projection optical system (b of FIG. 20).

According to still another embodiment of the present technology, the screen image projection system according to the present technology may include a plurality of screen image projection devices or a plurality of projection optical systems. With this arrangement, in a case where the ride position is changed, screen image display light can be projected to the position of the optical element for screen image display light diffraction after the ride position is changed, by changing the screen image projection device or the projection optical system, which project screen image display light.

Alternatively, as described in "(2-3) Optical element for screen image display light diffraction" above, the screen image projection system according to the present technology may include a plurality of optical elements for screen image display light diffraction for each eye. For example, vertically arranged two pieces of HOE films for each eye may be attached to the shield or inner visor of the helmet.

Figure 21:
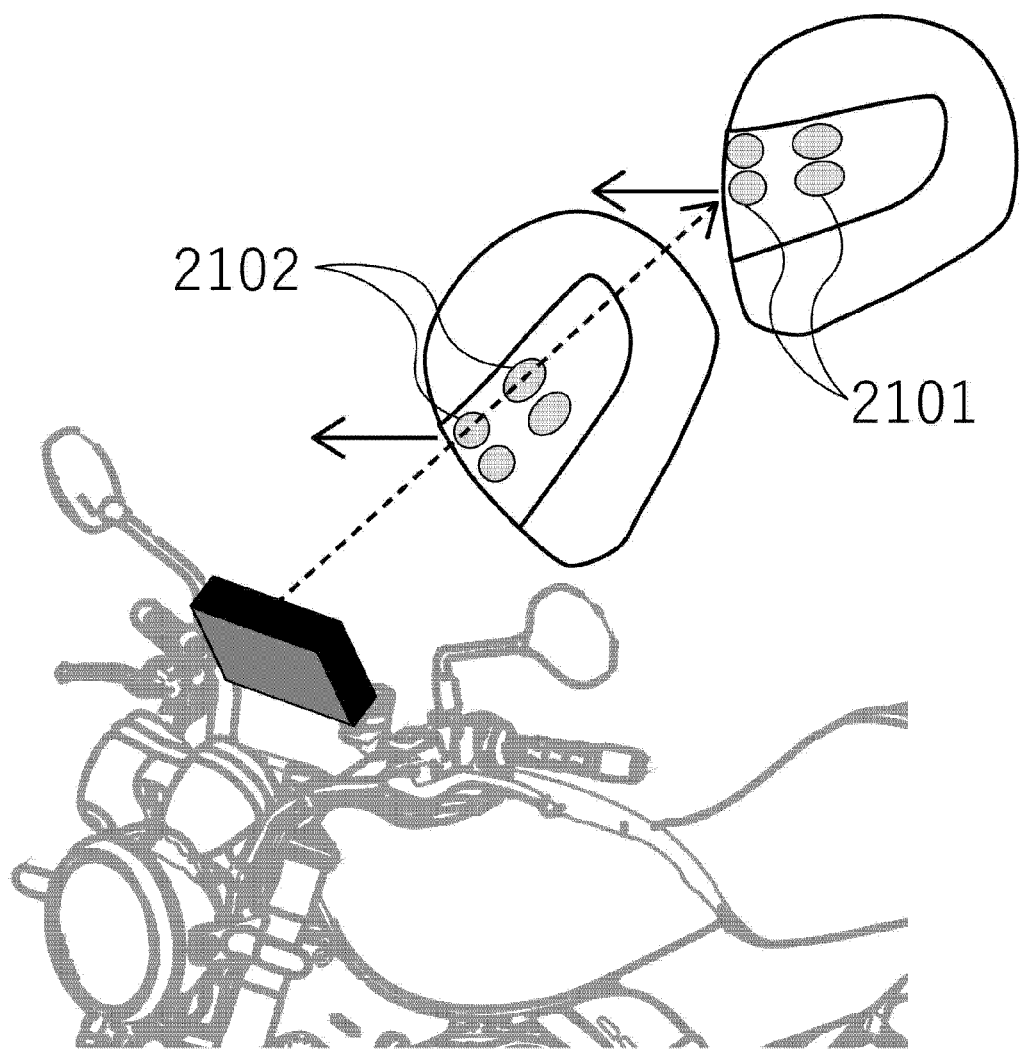
FIG. 21 is a diagram illustrating an example of a helmet to which a plurality of HOE films is attached.

As illustrated in FIG. 21, in a case where the ride position is high, screen image display light may be diffracted by lower HOE films 2101. Light from a landscape in front also passes through the lower HOE films 2101 and reaches the eyes of the user. That is, the user looks at a direction as indicated by an arrow extending forward from the lower HOE films 2101, that is, a traveling direction.

Furthermore, as illustrated in FIG. 21, in a case where the ride position is low, screen image display light may be diffracted by upper HOE films 2102. Light from a landscape in front also passes through the upper HOE films 2102 and reaches the eyes of the user. That is, the user looks at a direction as indicated by an arrow extending forward from the upper HOE films 2102, that is, a traveling direction.

A screen image display light incidence angle that can be diffracted by the HOE films 2101 may be different from a screen image display light incidence angle that can be diffracted by the HOE films 2102. By assigning a plurality of types of optical elements for screen image display light diffraction having different optical characteristics to each eye in this way, as compared with a case where the screen image projection system includes a plurality of screen image projection devices or a plurality of projection optical systems, it is possible to correspond to a change in a ride position at a lower cost.

(4) Third Example of First Embodiment (Example of Configuration for Dealing with Vibration of Moving Object)

For example, a moving object such as an automatic two-wheeled vehicle vibrates depending on a condition of a road surface and/or vibrates by an engine running. Therefore, the screen image projection device mounted on the moving object also vibrates. Then, the screen image projection system according to the present technology may also include a vibration damping unit for damping vibration derived from the moving object. Because vibration derived from the moving object is damped by the vibration damping unit, the user can look at a screen image more comfortably.

The screen image projection device may be mounted on the moving object via the vibration damping unit. Alternatively, the vibration damping unit may be included in the screen image projection device. Frequency of vibration damped by the vibration damping unit may be, for example, 150 Hz to 250 Hz, and in particular 180 Hz to 220 Hz.

According to one embodiment of the present technology, the vibration damping unit may include, for example, a bush or an insulator. Vibration may be damped by elasticity of the bush or insulator. Those skilled in the art can select a bush or insulator suitable for damping vibration having a certain frequency.

According to another embodiment of the present technology, the vibration damping unit may include a magnet. Examples of a vibration damping unit including a magnet include a voice coil motor (VCM). It is possible to damp vibration of a particular frequency by VCM. For example, assuming that frequency of spontaneous movement of a human is about 4 Hz and a maximum engine speed of a motorcycle is 12000 rpm=200 Hz, it is desirable that the vibration damping unit damps vibration of 204 Hz. The VCM can be set so as to dampen this vibration.

(5) Fourth Example of First Embodiment (Example Related to Use of System According to Present Technology as Alternative to Mirror)

The screen image projection system according to the present technology can also be used as an alternative to a rearward confirmation mirror of a moving object. For example, the screen image projection system according to the present technology may further include an imaging device for capturing a screen image of behind the moving object, and the screen image projection device may present the screen image of behind captured by the imaging device to the human. The imaging device may be configured as a separate device from the screen image projection device, or may be included in the screen image projection device.

Figure 22:
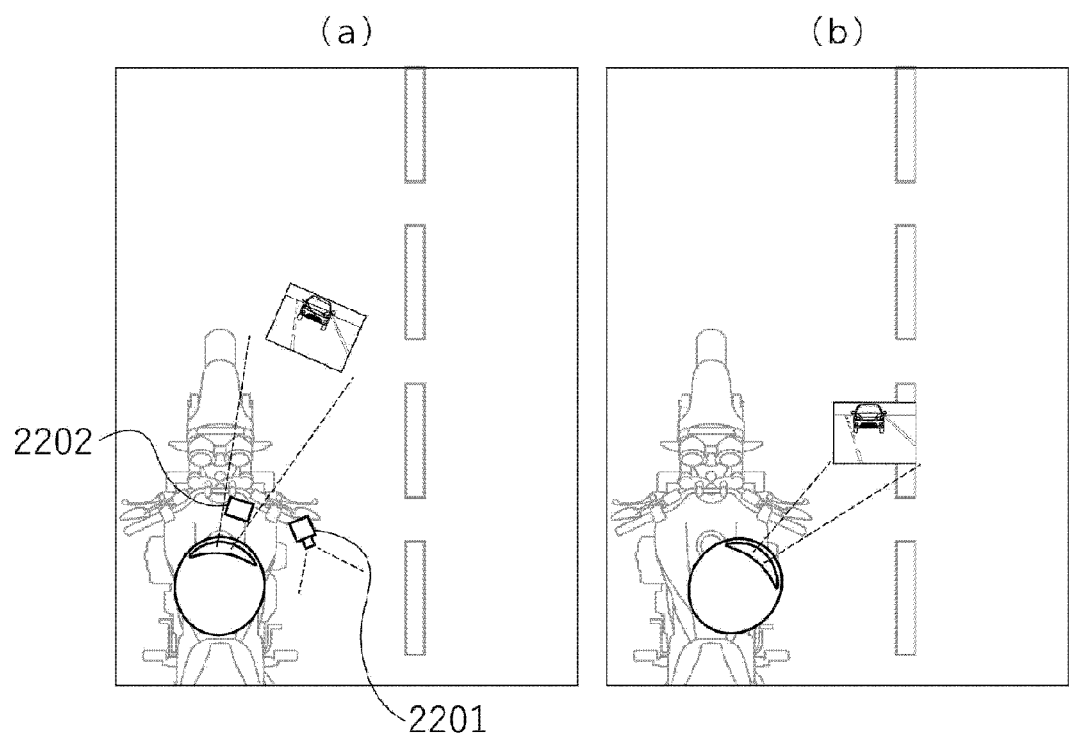
FIG. 22 is a diagram illustrating a status of rearward confirmation.

For example, in a case of confirming back with a rearward confirmation mirror while driving an automatic two-wheeled vehicle, a line of sight is shifted from a traveling direction, which may create a risk of an accident. For example, as illustrated in FIG. 22(b), it is necessary to look in a direction different from the traveling direction. Meanwhile, in the present technology, as illustrated in FIG. 22(a) for example, a screen image of behind captured by an imaging device 2201 is presented by a screen image projection device 2202. With this arrangement, deviation in a direction of a line of sight can be smaller than in a case where looking at the rearward confirmation mirror. With this arrangement, it is possible to reduce a risk of an accident. Furthermore, it is also possible to confirm a screen image of behind while looking at the traveling direction.

The screen image projection device may present a screen image of behind only in a case where a direction forming a predetermined angle with respect to the traveling direction is looked at. With this arrangement, the user can confirm the screen image of behind by looking in the direction only when necessary.

Figure 23:
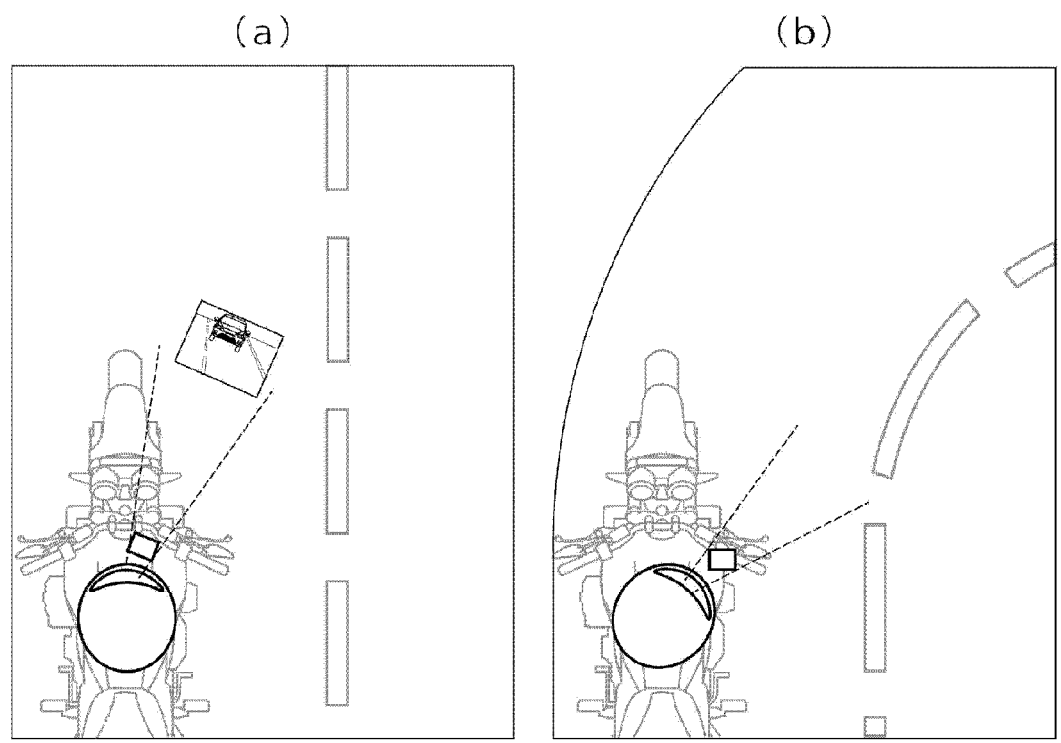
FIG. 23 is a diagram illustrating on or off of screen image display light by the screen image projection device when a moving object is traveling straight and when the moving object is making a turn.

The screen image projection device may include a turn detection unit. The turn detection unit may detect that the moving object is making a turn by, for example, detecting that handlebars of the moving object are turned and/or that the moving object is tilted. The turn detection unit may include a sensor capable of the detection. The sensor is known to those skilled in the art, and a sensor known in the art can be used as the sensor. The screen image projection device (the control unit in particular) stops projection of screen image display light corresponding to the turn detection unit detecting that the moving object is making a turn. For example, as illustrated in FIG. 23(a), screen image display light may be projected while the moving object is traveling straight, and as illustrated in FIG. 23(b), projection of the screen image display light may be stopped while the moving object is making a turn. With this arrangement, visibility in a direction of a curve can be ensured. Rearward confirmation with the rearward confirmation mirror is usually performed while the moving object is traveling straight. Therefore, screen image display light does not have to be projected when the moving object is making a turn.

2. Second Embodiment (Screen Image Projection Device)

The present technology also provides a screen image projection device included in a screen image projection system according to the present technology. The screen image projection device according to the present technology is, the screen image projection device is the screen image projection device described in "1. First embodiment (screen image projection system for moving object)" above, and all content described related to the screen image projection device is applied to the screen image projection device according to the present embodiment. Therefore, description of the device is omitted.

By using the screen image projection device in combination with the optical element for screen image display light diffraction described in "1. First embodiment (screen image projection system for moving object)" above, effects as described above can be obtained.

3. Third Embodiment (Optical Element for Screen Image Display Light Diffraction)

The present technology also provides an optical element for screen image display light diffraction included in a screen image projection system according to the present technology. The optical element for screen image display light diffraction is used for diffracting screen image display light projected from a screen image projection device according to the present technology and causing the screen image display light to reach human eyes that move along with a moving object. Preferably, the optical element for screen image display light diffraction is separated from the screen image projection device.

The optical element for screen image display light diffraction is the optical element for screen image display light diffraction described in "1. First embodiment (screen image projection system for moving object)" above, and all content described related to the optical element for screen image display light diffraction is applied to the optical element for screen image display light diffraction according to the present embodiment. Therefore, description of the optical element is omitted.

By using the optical element in combination with the screen image projection device described in "1. First embodiment (screen image projection system for moving object)" above, effects as described above can be obtained.

4. Fourth Embodiment (Helmet Including Optical Element for Screen Image Display Light Diffraction)

The present technology also provides a helmet including an optical element for screen image display light diffraction included in a screen image projection system according to the present technology. Preferably, the helmet is separated from the screen image projection device.

The helmet and an optical element for screen image display light diffraction included in the helmet are the helmet and optical element for screen image display light diffraction described in "1. First embodiment (screen image projection system for moving object)" above, and all content described related to the helmet and optical element for screen image display light diffraction are applied to the helmet and optical element for screen image display light diffraction according to the present embodiment. Therefore, description of the helmet and optical element is omitted.

By using the helmet in combination with the screen image projection device described in "1. First embodiment (screen image projection system for moving object)" above, effects as described above can be obtained.

5. Fifth Embodiment (Method for Projecting Screen Image)

(1) Description of Fifth Embodiment

The present technology provides a method for projecting a screen image on a moving object, the method including a projection step of projecting screen image display light from a screen image projection device mounted on a moving object toward an optical element for screen image display light diffraction arranged in front of human eyes that move along with the moving object, and a diffraction step of diffracting the screen image display light projected in the projection step and causing the screen image display light to reach the human eyes By using the method for projecting a screen image according to the present technology, effects as described in "1. First embodiment (screen image projection system for moving object)" above can be obtained.

(2) Example of Fifth Embodiment (Method for Projecting Screen Image)

Figure 24:
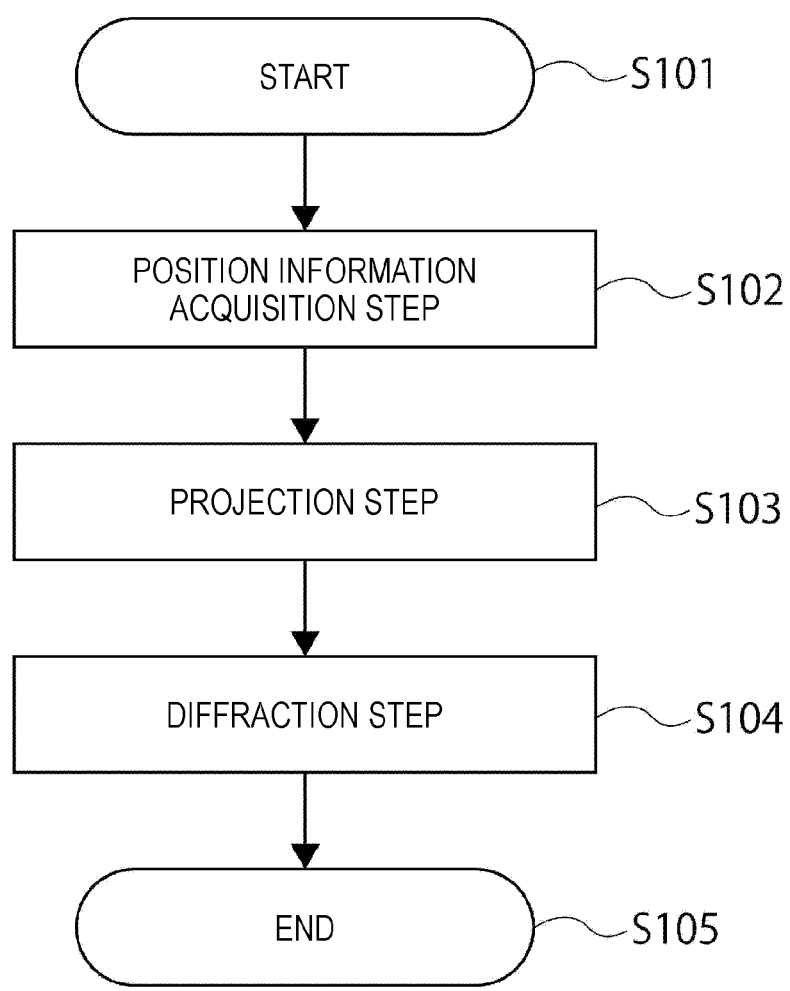
FIG. 24 is an example of a flow of a method for projecting a screen image according to the present technology.

An example of a method for projecting a screen image according to the present technology will be described below with reference to FIGS. 1, 5, and 24. FIG. 24 is a diagram illustrating an example of a flow of a method for projecting a screen image according to the present technology.

In Step S101, a screen image projection device 101 starts screen image projection processing according to the present technology.

In a position information acquisition step in Step S102, a position information acquisition unit 502 acquires position information of an optical element for screen image display light diffraction 103. The position information acquisition step may include an image acquisition step in which, for example, a control unit 503 drives an optical detection device 504 and cause the optical detection device 504 to acquire an image in the optical element for screen image display light diffraction 103, and an information processing step in which an image processing unit 505 acquires position information of the optical element for screen image display light diffraction 103 from the image.

In a projection step in Step S103, a projection optical system 501 projects screen image display light toward the optical element for screen image display light diffraction 103 on the basis of the position information acquired in Step S102. For example, before screen image display light is projected, the control unit 503 may control the screen image display light to be projected on the basis of the position information.

In a diffraction step in Step S104, the screen image display light projected in the projection step is diffracted by the optical element for screen image display light diffraction 103 and reaches the human eyes.

In Step S105, the screen image projection device 101 ends screen image projection processing according to the present technology.

The above processing may be performed by, for example, the screen image projection device according to the present technology. For more detailed operation of each component of the screen image projection device in each of the above-described steps, refer to "1. First embodiment (screen image projection system for moving object)" described above.

Note that the following configurations can be used for the present technology.

[1] A screen image projection system for moving object including a screen image projection device mounted on a moving object, and an optical element for screen image display light diffraction arranged in front of human eyes that move along with the moving object, optical element for screen image display light diffraction diffracting screen image display light projected from the screen image projection device and causing the screen image display light to reach the human eyes.

[2] The screen image projection system for moving object according to [1], in which the screen image projection device is arranged on the moving object such that an optical path from the screen image projection device to the optical element forms an angle of 10 degrees or larger to upward or downward with respect to a traveling direction of the moving object.

[3] The screen image projection system for moving object according to [1] or [2], in which the screen image projection device is arranged at a position lower than the human eyes.

[4] The screen image projection system for moving object according to any one of [1] to [3], in which the screen image projection device is arranged on the moving object such that an optical path from the screen image projection device to the optical element for screen image light diffraction and an optical path from a rearward confirmation mirror of the moving object to the human eyes or to the optical element for screen image light diffraction do not overlap with each other.

[5] The screen image projection system for moving object according to any one of [1] to [4], in which the screen image projection device is able to change a direction of the screen image display light.

[6] The screen image projection system for moving object according to any one of [1] to [5], further including a pedestal used for mounting the screen image projection device on the moving object, the pedestal being able to change a direction of the screen image display light.

[7] The screen image projection system for moving object according to any one of [1] to [6], further including a vibration damping unit that damps vibration derived from the moving object.

[8] The screen image projection system for moving object according to any one of [1] to [7], further including an imaging device that captures a screen image of behind the moving object, in which the screen image projection device presents a screen image of behind captured by the imaging device to the human.

[9] The screen image projection system for moving object according to any one of [1] to [8], in which the moving object includes a vehicle.

[10] The screen image projection system for moving object according to any one of [1] to [9], in which the moving object includes a two-wheeled vehicle.

[11] The screen image projection system for moving object according to any one of [1] to [10], in which the optical element is mounted on a helmet or glasses worn by the human.

[12] The screen image projection system for moving object according to any one of [1] to [11], in which the optical element is mounted on a helmet shield or inner visor of a helmet worn by the human.

[13] The screen image projection system for moving object according to any one of [1] to [12], in which the optical element is molded as a part of a helmet shield or inner visor of a helmet worn by the human.

[14] The screen image projection system for moving object according to any one of [1] to [13], further including, as the optical element for screen image display light diffraction, a plurality of optical elements for screen image display light diffraction having different optical characteristics, or an optical element for screen image display light diffraction having a plurality of regions having different optical characteristics.

[15] A screen image projection device mounted on a moving object, the screen image projection device projecting screen image display light toward an optical element for screen image display light diffraction arranged in front of human eyes that move along with the moving object.

[16] An optical element for screen image display light diffraction used for diffracting screen image display light projected from a screen image projection device mounted on a moving object and causing the screen image display light to reach human eyes that move along with the moving object.

[17] A helmet including an optical element for screen image display light diffraction used for diffracting screen image display light projected from a screen image projection device mounted on a moving object and causing the screen image display light to reach human eyes that move along with the moving object.

[18] A method for projecting a screen image on a moving object, the method including a projection step of projecting screen image display light from a screen image projection device mounted on a moving object toward an optical element for screen image display light diffraction arranged in front of human eyes that move along with the moving object, and a diffraction step of diffracting the screen image display light projected in the projection step and causing the screen image display light to reach the human eyes.

REFERENCE SIGNS LIST

100 Screen image projection system for moving object
101 Screen image projection device
102 Handlebars
103 Optical element for screen image display light diffraction
104 Helmet
105 Shield
110 Automatic two-wheeled vehicle

The invention claimed is:

1. A screen image projection system for moving object comprising:
 a screen image projection device; and
 an optical element, which is for screen image display light diffraction,
 wherein
 the screen image projection device is mounted on a moving object,
 the screen image projection device is configured such that the screen image display light is projected toward the optical element,
 the optical element is arranged in front of human eyes that move along with the moving object, the optical element diffracting screen image display light projected from the screen image projection device and causing the screen image display light to reach the human eyes,
 the screen image projection system uses a Maxwellian view,
 the screen image projection system has a position information acquisition unit configured to determine a position of the optical element, and
 the optical element has an optical characteristic of diffracting only light that enters from a predetermined angle to cause the screen image display light to reach the human eyes, such that a user can visually confirm a screen image only in a case where the optical element is at a predetermined position with respect to the screen image projection device.

2. A screen image projection system for moving object comprising:
 a screen image projection device mounted on a moving object; and
 an optical element for screen image display light diffraction arranged in front of human eyes that move along with the moving object, the optical element for screen image display light diffraction diffracting screen image display light projected from the screen image projection device and causing the screen image display light to reach the human eyes,
 wherein the screen image projection device is arranged on the moving object such that an optical path from the screen image projection device to the optical element forms an angle of 10 degrees or larger to upward or downward with respect to a traveling direction of the moving object.

3. The screen image projection system for moving object according to claim 1,
 wherein the screen image projection device is arranged at a position lower than the human eyes.

4. The screen image projection system for moving object according to claim 1,
 wherein the screen image projection device is arranged on the moving object such that an optical path from the screen image projection device to the optical element for screen image light diffraction and an optical path from a rearward confirmation mirror of the moving object to the human eyes or to the optical element for screen image light diffraction do not overlap with each other.

5. The screen image projection system for moving object according to claim 1,
 wherein the screen image projection device is able to change a direction of the screen image display light.

6. The screen image projection system for moving object according to claim 1, further comprising a pedestal used for mounting the screen image projection device on the moving object, the pedestal being able to change a direction of the screen image display light.

7. The screen image projection system for moving object according to claim 1, further comprising a vibration damping unit that damps vibration derived from the moving object.

8. The screen image projection system for moving object according to claim 1, further comprising an imaging device that captures a screen image of behind the moving object,
 wherein the screen image projection device presents a screen image of behind captured by the imaging device to the human.

9. The screen image projection system for moving object according to claim 1,
 wherein the moving object includes a vehicle.

10. The screen image projection system for moving object according to claim 1,
 wherein the moving object includes a two-wheeled vehicle.

11. The screen image projection system for moving object according to claim 1,
 wherein the optical element is mounted on a helmet or glasses worn by the human.

12. The screen image projection system for moving object according to claim 1,
 wherein the optical element is mounted on a helmet shield or inner visor of a helmet worn by the human.

13. The screen image projection system for moving object according to claim 1,
 wherein the optical element is molded as a part of a helmet shield or inner visor of a helmet worn by the human.

14. The screen image projection system for moving object according to claim 1, further comprising, as the optical element for screen image display light diffraction, a plurality of optical elements for screen image display light diffraction having different optical characteristics, or an optical element for screen image display light diffraction having a plurality of regions having different optical characteristics.

15. A screen image projection device mounted on a moving object, the screen image projection device projecting screen image display light toward an optical element for screen image display light diffraction arranged in front of human eyes that move along with the moving object,
 wherein
 the screen image projection device is configured such that the screen image display light is projected toward the optical element, which has an optical characteristic of diffracting only light that enters from a predetermined angle to cause the screen image display light to reach the human eyes, such that a user can visually confirm a screen image only in a case where the optical element is at a predetermined position with respect to the screen image projection device, the screen image projection device is configured to use a Maxwellian view, and the screen image projection device has a position information acquisition unit configured to determine a position of the optical element.

16. An optical element for screen image display light diffraction used for diffracting screen image display light projected from a screen image projection device mounted on a moving object and causing the screen image display light to reach human eyes that move along with the moving object, the optical element uses a Maxwellian view, the optical element is configured to be positioned such that a position information acquisition unit determines a position of the optical element, and the optical element has an optical characteristic of diffracting only light that enters from a predetermined angle to cause the screen image display light to reach the human eyes, such that a user can visually confirm a screen image only in a case where the optical element is at a predetermined position with respect to the screen image projection device.

17. A helmet comprising the optical element of claim 16.

18. A method for projecting a screen image on a moving object, the method comprising:

a projection step of projecting screen image display light from a screen image projection device mounted on a moving object toward an optical element for screen image display light diffraction arranged in front of human eyes that move along with the moving object; and a diffraction step of diffracting the screen image display light projected in the projection step and causing the screen image display light to reach the human eyes, wherein the optical element uses a Maxwellian view, the screen image projection device has a position information acquisition unit configured to determine a position of the optical element, and the optical element has an optical characteristic of diffracting only light that enters from a predetermined angle to cause the screen image display light to reach the human eyes, such that a user can visually confirm a screen image only in a case where the optical element is at a predetermined position with respect to the screen image projection device.

* * * * *